United States Patent
Jitsuno (10) Patent No.: US 7,023,893 B2
(45) Date of Patent: Apr. 4, 2006

(54) LOW-PRESSURE AXIAL DIRECTION EXCITATION TYPE $F_2$ LASER OSCILLATOR

(75) Inventor: Takahisa Jitsuno, Toyonaka (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/489,103

(22) PCT Filed: Jul. 8, 2002

(86) PCT No.: PCT/JP02/06898

§ 371 (c)(1), (2), (4) Date: Aug. 31, 2004

(87) PCT Pub. No.: WO03/023914

PCT Pub. Date: Mar. 20, 2003

(65) Prior Publication Data

US 2005/0018735 A1    Jan. 27, 2005

(30) Foreign Application Priority Data

Sep. 10, 2001   (JP)   ............................. 2001-274191

(51) Int. Cl.
*H01S 3/22*   (2006.01)
*H01S 3/03*   (2006.01)
*H01S 3/097*   (2006.01)

(52) U.S. Cl. ...................... 372/59; 372/55; 372/57; 372/60; 372/61; 372/87

(58) Field of Classification Search .................. 372/55, 372/57, 58, 59, 60, 61, 87, 88
See application file for complete search history.

(56) References Cited

FOREIGN PATENT DOCUMENTS

JP    2002-76489    3/2002
JP    2002-198590   7/2002

OTHER PUBLICATIONS

Yamada et al, High-power discharge-pumped F2 molecular laser, Feb. 13, 1989,Appl.Phys. Lett. 54 (7), pp. 597-599.*
El-Osealy et al, Development of VUV F2 lasers excited by longitudinal discharge at very low pressure (40 Torr), Jul. 15-19, 2001, Laser and Electro-Optics,Cleo/Pacific Rim, pp. 28-29.*

(Continued)

*Primary Examiner*—Minsun Oh Harvey
*Assistant Examiner*—Armando Rodriguez
(74) *Attorney, Agent, or Firm*—Wenderoth, Lind & Ponack, L.L.P.

(57) ABSTRACT

An axial direction excitation type $F_2$ laser apparatus comprises a discharge tube consisting of an insulating cylinder and metal electrodes at both ends of thereof, and a reflecting mirror or a transmitting mirror, constituting a resonator, outside the electrodes. A high voltage for pulse discharge is applied to the electrodes from a drive circuit. Total gas pressure in the discharge tube is set in a range between 10 Torr. and 100 Torr., and concentration of $F_2$ gas to total gas in the discharge tube is set to be in a range between 0.2% and 2.0%. This low-pressure axial direction excitation type $F_2$ laser apparatus having small size and high efficiency can be provided at a low cost.

8 Claims, 4 Drawing Sheets

OTHER PUBLICATIONS

M.A.M. El-Osealy et al., "Zen-atsu 40Torr de Hasshin suru Dojiku Reiki Shinku Shigai $F_2$ Laser", Dai 53 Kai Laser Kako Gakkai Ronbunshu, 2001. 07, pp. 63-69.

M.A.M. El-Osealyi et al., Development of VUV $F_2$ Lasers Excited by Longitudinal Discharge at CLEO/Pacific Rim 20 Postdeadline Paper, Jul. 15-19, 2001, WJPD1-2, pp. 28-29.

M.A.M. El-Osealy et al., "Gain characteristics of Longitudinally excited $F_2$ lasers", Optics Communications May 1, 2002, vol. 205, pp. 377-384.

Takuda Ido et al., "Tategata Hoden Reiki Husso Genshi Laser", Memoirs of Konan University, Jul. 25, 2000, vol. 4 No. 1, pp. 13-20.

M.A.M. El-Osealy et al., "Co-axially excited gas lasers toward vacuum ultra-violet region", Proceedings of SPII Advanced High-Power Lasers, Nov. 1-5, 1999, pp. 774-779.

M.A.M. El-Osealy et al., "Oscillation and gain characteristics of high power co-axially excited $N_2$ gas lasers", Optics Communications, Jul. 1, 2001, vol. 194, pp. 191-199.

M.A.M. El-Osealy et al., "Longitudinally Excited VUV $F_2$ Laser at Total Gas Pressure of 40 Torr", Jul. 2001, pp. 63-69, with English translation.

M.A.M. El-Osealy et al., Development of VUV $F_2$ Lasers Excited by Longitudinal Discharge at Very Low Pressure (40 Torr). CLEO/Pacific Rim 2001 Postdeadline Paper, Jul. 15-19, 2001, WJPD1-2, pp. 28-29.

M.A.M. El-Osealy et al., "Gain characteristics of longitudinally excited $F_2$ lasers", Optics Communications, May 1, 2002, vol. 205, pp. 377-384.

V.N. Ishchenko et al., "High-power efficient vacuum ultraviolet $F_2$ laser excited by an electric discharge", Institute of Heat Physics, Siberian Branch of the Academy of Sciences of the USSR, Novosibirsk, American Institute of Physics May 16, 1986, pp. 707-709.

M. Kakehata et al., "Transient absorption and its influence on energy extraction in a discharge-pumped $F_2$ laser", Department of Electrical Engineering, Faculty of Science and Technology, Keio University, American Institute of Physics, Feb. 1, 1994, pp. 1304-1310.

S.M. Hooker et al., "Influence of Cavity Configuration on the Pulse Energy of a High-Pressure Molecular Fluorine Laser", University of Oxford, Department of Atomic and Laser Physics, The Clarendon Laboratory, Applied Physics B, 1992, pp. 54-59.

C. Skordoulis et al., "Gain and Saturation Measurements in a Discharge Excited $F_2$ Laser Using an Oscillator Amplifier Configuration", Theoretical and Physical Chemistry Institute, National Hellenic Research Foundation, Applied Physics B, 1990, pp. 141-145.

K. Yamada et al., "High-power discharge-pumped $F_2$ molecular laser", Applied Physics, Feb. 13, 1989, pp. 597-599.

M.A.M. El-Osealy et al., "Oscillation and gain characteristics of longitudinally excited VUV $F_2$ laser at 40 Torr total pressure", Optics Communications, Jun. 15, 2002, pp. 255-259.

* cited by examiner

BP: Biplanar Phototube
BS: Beam Splitter

LOW-PRESSURE AXIAL DIRECTION EXCITATION TYPE $F_2$ LASER OSCILLATOR

This application is a National Stage application of PCT/JP02/06898, filed Jul. 8, 2002.

TECHNICAL FIELD

The present invention relates to a low-pressure axial direction excitation type $F_2$ laser apparatus. In particular, the present invention relates to a low-pressure axial direction excitation type $F_2$ laser apparatus that is useful for a light source of a semiconductor exposure apparatus or the like, that oscillates at a low pressure, that is small in size, high in efficiency and low in cost.

BACKGROUND ART

Conventionally, as a semiconductor process becomes finer, an exposure wavelength of a laser used in a semiconductor exposure apparatus is made short. Excimer lasers such as a krypton fluoride (KrF: 248 nm) laser and an argon fluoride (ArF: 193 nm) laser have been put to practical use. In addition, an $F_2$ laser ($F_2$: 157 nm) oscillating in a vacuum ultraviolet ray region is anticipated as a light source of a next generation. Furthermore, in the $F_2$ laser, photon energy is as large as approximately 7.9 eV. Even in a material having a large band gap, such as silica, an absorption coefficient is large. Therefore, new application to materials that have been said to be difficult in working is also anticipated.

Furthermore, gas used in the $F_2$ laser is simple mixed gas composed of He and $F_2$. The laser does not use expensive gas, such as Ne or Xe, and it does not contain a component, such as Ar, that tends to localize a discharge. Therefore, the gas used in the $F_2$ laser has a merit in that stable discharge can be easily obtained.

In addition, in a study of the $F_2$ laser, oscillation up to approximately 260 mJ/pulse is already obtained and its aspect suited to a higher output has been exhibited. If the $F_2$ laser is put to practical use, it is anticipated to become a laser that can be applied to various fields.

As described above, the $F_2$ laser is a short-wavelength laser having a great advantage. However, in existing circumstances in which a traditional $F_2$ laser of a transverse direction excitation type, in which direction of laser light becomes perpendicular to a discharge current direction, and of an ultraviolet ray preliminary ionization type, there are a large number of problems. It has been considered that it is difficult to overcome these problems with a traditional way of thinking.

First, a high gas pressure is required for the $F_2$ laser. At least 3 atm is required, and in a case where required gas pressure is high, a pressure as high as 10 atm is required. Therefore, it has been considered that it is necessary to use a large-sized chassis having a high strength. Therefore, an apparatus as a whole becomes large and expensive.

Second, for conducting high repetition operations, it is necessary to let gas flow at a high speed. For example, for causing operation at a repetition frequency exceeding 5 kHz, it has been considered that it is necessary to let gas flow at a speed exceeding several tens m/sec. This results in a problem of power required to drive a fan exceeding 20 kW.

In addition, there is a phenomenon called gas life. If the laser is activated, its output falls within a relatively short time. Unless laser gas is exchanged frequently, the output cannot be maintained. As regards the gas life, it has been coped with by exchanging the gas, while how a cause material decreases laser output is unknown.

In the $F_2$ laser a self-excitation voltage of discharge is high and the discharge is apt to become unstable. In a transverse direction excitation type laser, therefore, an electrode interval is set to approximately 10 mm. However, understanding of homogeneous discharge generated in this narrow electrode gap of approximately 10 mm is insufficient. In a time of approximately 10 nanoseconds during which discharge is formed, even electrons cannot cross a gap between electrodes, and move little. Nevertheless, it is necessary to generate homogeneous discharge. An occurrence condition of homogeneous discharge has been looked for experimentally, that is, details of development that has been conducted heretofore.

In addition, in a lamp with $F_2$ gas sealed therein at a low pressure, a luminous efficiency exceeding 50% is obtained in continuous lighting that extends over several thousands hours. Therefore, it is expected that a cause of a low coefficient and a short gas life exists in structure itself of the laser apparatus. Indeed, after the present inventors' study conducted for approximately 10 recent years, a conclusion that most of these are mere structural problems of the transverse direction excitation and an ultraviolet ray preliminary ionization type laser has been reached.

For example, as for high gas pressure required for the laser apparatus, it is considered that in a state in which an electrode gap in the transverse direction excitation type laser is narrow and preliminary ionization is sufficiently conducted, a discharge start voltage becomes a function of only pressure and an effective operating voltage does not rise unless a high gas pressure is used. A reason why the gas must be allowed to flow at high speed is also based on the narrow electrode gap in the transverse direction excitation type laser. If remaining electric charge exists, a discharge is localized. Therefore, it is considered that the gas is allowed to flow to remove a remaining electric charge.

As for gas life, this relates to a type in which discharge gas is subject to preliminary ionization using ultraviolet rays. Since impurities stored in the discharge gas absorbs preliminary ionization light, a quantity of light arriving at a discharge space decreases, resulting in a state of insufficient preliminary ionization. It is considered that as a result homogeneity in the discharge falls and output decreases.

Therefore, the present inventors have noticed a supposition that those problems might be solved by fundamentally altering structure of the laser apparatus, and decided to adopt an axial direction excitation type laser, in which an optical axis of laser light and a discharge current pass through the same path, instead of the conventional transverse direction excitation and ultraviolet ray preliminary ionization type laser. In this axial direction excitation type laser, excitation discharge occurs on the optical axis, and consequently an electrode gap becomes as wide as a range of 15 cm to 30 cm and it becomes possible to obtain a high discharge start voltage even at a low gas pressure. Therefore, the gas pressure can be made low, and consequently structure of the laser apparatus becomes very simple. As a result, not only remarkable size reduction of the apparatus becomes possible, but also a blower for preventing a remaining charge in a discharge space from affecting homogeneity of the discharge becomes unnecessary.

As regards an increase of impurities, which affect gas life, it also becomes possible to seal and use a discharge tube over a long period of time by hard-sealing components. In addition, in the axial direction excitation type laser, preliminary ionization can be conducted from outside of the discharge tube without using ultraviolet light. Therefore, there is a possibility that the gas life, which has posed a problem in the conventional transverse direction excitation type laser, will matter little. Indeed, for example, in a copper vapor laser, it has become clear that an output of kW class with a repetition of several hundreds kHz is obtained with a low pressure gas without allowing flow of the gas, owing to use of the axial direction excitation type laser.

Therefore, the present inventors have adopted the axial direction excitation type laser as the $F_2$ laser as well, and developed an axial direction excitation type $F_2$ laser apparatus having a stable output and a high efficiency and allowing high repetition (Japanese Patent Application Publication No. 2000-265435).

In this developed axial direction excitation type $F_2$ laser, however, the laser oscillates at a pressure near 1 atm. Therefore, the present inventors have continued studies in order to implement a highly efficient axial direction excitation type $F_2$ laser that generates oscillation at a lower pressure.

The present invention has been achieved in view of the circumstances heretofore described. The present inventors aim at providing a small-sized, highly efficient, low-cost, low-pressure axial direction excitation type $F_2$ laser apparatus oscillating at a pressure that is as low as 1/20 to 1/100 that of a conventional laser apparatus.

SUMMARY OF THE INVENTION

As a solution to the above-described aim, the present invention firstly provides a low-pressure axial direction excitation type $F_2$ laser apparatus comprising: a discharge tube consisting of an insulating cylinder and metal electrodes at both ends thereof; and a reflecting mirror or a transmitting mirror, constituting a resonator, outside the electrodes. A high voltage for pulse discharge is applied to the electrodes from a drive circuit, an optical axis of laser light is generated by oscillation, and a main discharge current passes through same path, wherein a total gas pressure in the discharge tube is set in a range between 10 Torr. and 100 Torr., and a concentration of an $F_2$ gas to total gas in the discharge tube is set to be in a range between 0.2% and 2.0%.

The present invention secondly provides the low-pressure axial direction excitation type $F_2$ laser apparatus, wherein the total gas pressure in the discharge tube is set in a range between 35 Torr. and 45 Torr.

The present invention thirdly provides the low-pressure axial direction excitation type $F_2$ laser apparatus, wherein in order to avoid laser light absorption due to a long life of a lower level concerning laser oscillation, an excitation density is controlled and gain sustaining time is controlled by changing a discharge voltage or capacitance.

The present invention fourthly provides the low-pressure axial direction excitation type $F_2$ laser apparatus, wherein a gain length is shortened and thereby a length of the resonator is made as short as 10 cm to 30 cm to shorten round-trip time of light and make the resonator sufficiently effective.

Reference numerals in the drawings denote the following components:

| | |
|---|---|
| 1 | discharge tube |
| 2,3 | cylindrical electrodes |
| 4 | spark gap |
| 5 | reflecting mirror |
| 6 | transmitting mirror |
| 7 | capacitor of main discharge circuit |
| 8 | peaking capacitor |
| 9 | capacitor of preliminary ionization circuit |
| 10 | copper foil |
| 11 | low-pressure axial direction excitation type $F_2$ laser apparatus |
| 12 | transverse direction excitation type $F_2$ laser discharge tube |
| 13 | coaxial discharge tube (amplifier tube) |

DETAILED DESCRIPTION OF THE PREFERRED EMBODIMENTS

A low-pressure axial direction excitation type $F_2$ laser apparatus according to the present invention is an axial direction excitation type $F_2$ laser apparatus comprising a discharge tube consisting an insulating cylinder and metal electrodes at both ends thereof, and a reflecting mirror or a transmitting mirror, constituting a resonator, outside the electrodes. A high voltage for pulse discharge is applied to the electrodes from a drive circuit, an optical axis of laser light is generated by oscillation, and a main discharge current passes through same path. Highly efficient laser oscillation can be caused at a low pressure by setting a total gas pressure in the discharge tube equal to a value in a range between 10 Torr. and 100 Torr., and setting a concentration of an $F_2$ gas to total gas in the discharge tube equal to a value in a range between 0.2% and 2.0%. Specifically, by setting the total gas pressure in the discharge tube to a value in a range between 35 Torr. and 45 Torr., a further high output can be obtained, and highly efficient laser oscillation becomes possible.

Typically, in the case of the $F_2$ laser, the discharge tube is filled up with mixed gas composed of $F_2$ and inert gases such as He, and excitation discharge is caused in the gas. In this excitation discharge, electrons generated by ionization are accelerated by an applied electric field, and the electrons collide with $F_2$ in the discharge tube and raise the $F_2$ to an excitation state. As a result, laser gas generates an optical gain at a laser wavelength, and laser oscillation is caused by repetitive reflection at a resonator.

The $F_2$ laser thus oscillates. According to a mechanism considered heretofore, He (or inert gas such as Ne) is excited, and He and $F_2$ collide with each other. By receiving energy, $F_2$ is dissociated to emit light. During oscillation of the $F_2$ laser at a low pressure according to the present invention, however, rise of a gain begins immediately after a start of a main discharge. Therefore, it is considered that the oscillation is caused by excitation of the $F_2$ directly to an upper level due to collision of electrons during discharge. It is considered that oscillation at a low pressure is caused by such a mechanism.

Since oscillation at a low pressure becomes possible as described above, a voltage withstand property in the laser apparatus also becomes unnecessary and remarkable size reduction of the laser apparatus becomes possible. Furthermore, since high-pressure gas is not used, $F_2$ gas having toxicity can be used at a pressure lower than atmospheric pressure. Therefore, it is not necessary to provide the apparatus with high pressure gas piping, and a risk that poison gas will leak becomes nil.

In the axial direction excitation type $F_2$ laser apparatus as described above, in order to avoid laser light absorption due to a long life of a lower level concerning laser oscillation, an excitation density is controlled and gain sustaining time is controlled by changing a discharge voltage or capacitance. As a result, highly efficient laser oscillation becomes possible.

In an axial direction excitation type $F_2$ laser apparatus, a gain length is shortened and thereby a length of the resonator is made as short as 10 cm to 30 cm to shorten round-trip time of light and make the resonator sufficiently effective. As a result, oscillation having a narrow wavelength and a favorable directivity can be obtained. In the case of $F_2$, life of the upper level is considered to be approximately 3.5 nanoseconds. Therefore, the round-trip time of light needs to be less than approximately 3.5 nanoseconds. Since light travels at a speed of 3.3 nanoseconds per meter, a transit distance less than 1 m and a round-trip distance of at most 0.5 m become necessary conditions. By making the resonator length as short as 10 to 30 cm as compared with a conventional resonator length of 0.5 to 1 m, the round-trip time of light can be shortened and the resonator can be made sufficiently effective.

Hereafter, embodiments will be shown with reference to the accompanying drawings, and a mode for carrying out the present invention will be described in further detail. Of course, the present invention is not limited to the following examples, and it is a matter of course that various modes are possible as regards the details.

EMBODIMENTS

Embodiment 1

Figure 1:
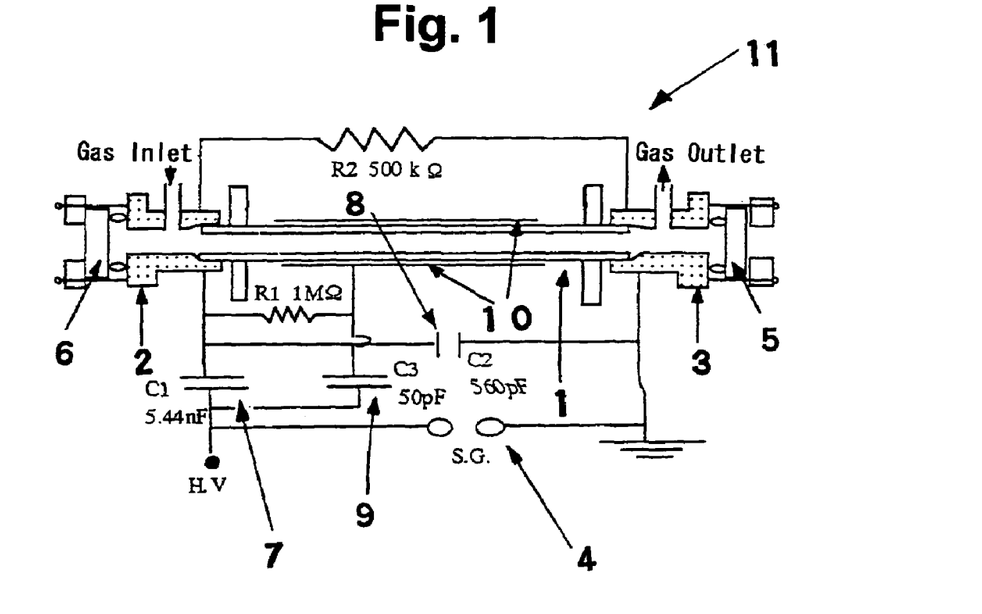
FIG. 1 is a schematic diagram exemplifying a low-pressure axial direction excitation type $F_2$ laser apparatus and a drive circuit according to the present invention.

FIG. 1 shows a schematic diagram of a discharge tube in a low-pressure axial direction excitation type $F_2$ laser apparatus according to the present invention, and a drive circuit. As shown in FIG. 1, a discharge tube 1 is a ceramic pipe having an inside diameter of 5 mm and a length of 15 cm. Cylindrical electrodes 2 and 3 serving also as mirror holders are attached to respective ends of the discharge tube 1. These cylindrical electrodes 2 and 3 have a gas inlet and a gas outlet, respectively. A high voltage pulse generated from a capacitance shift type discharge circuit using a high pressure type spark gap 4 is applied to the electrodes 2 and 3. A reflecting mirror 5 and a transmitting mirror 6, which form a resonator, are attached outside of these electrodes 2 and 3, respectively.

In this circuit, a capacitor for conducting preliminary ionizing on the discharge tube 1 is also connected in parallel to a main discharge circuit. As for capacitance in a power supply circuit, a capacitor 7 in the main discharge circuit has capacitance of 5.4 nF, a peaking capacitor 8 has capacitance of 560 pF, and a capacitor 9 in a preliminary ionization circuit has capacitance of 50 pF. As for preliminary ionization, a high voltage is applied to copper foil 10 wound around an outer periphery of the discharge tube 1, and consequently weak corona discharge is generated on a wall surface in low-pressure discharge tube 1. The preliminary ionization is thus conducted automatically. By sealing He and $F_2$ gas diluted in He of approximately 5% in the discharge tube 1, laser oscillation is obtained.

First, gain measurement was conducted in order to look for an optimum condition of a low-pressure axial direction excitation type $F_2$ laser apparatus 11 in this example.

Since a gain measurement of a pulse laser in a vacuum ultraviolet region, such as an $F_2$ laser, involves difficulty, first the discharge tube was activated as an $N_2$ laser, in which handling of gas is simple and laser light can be propagated in an atmosphere, and a gain measurement system and a measurement technique were completed.

Figure 2:
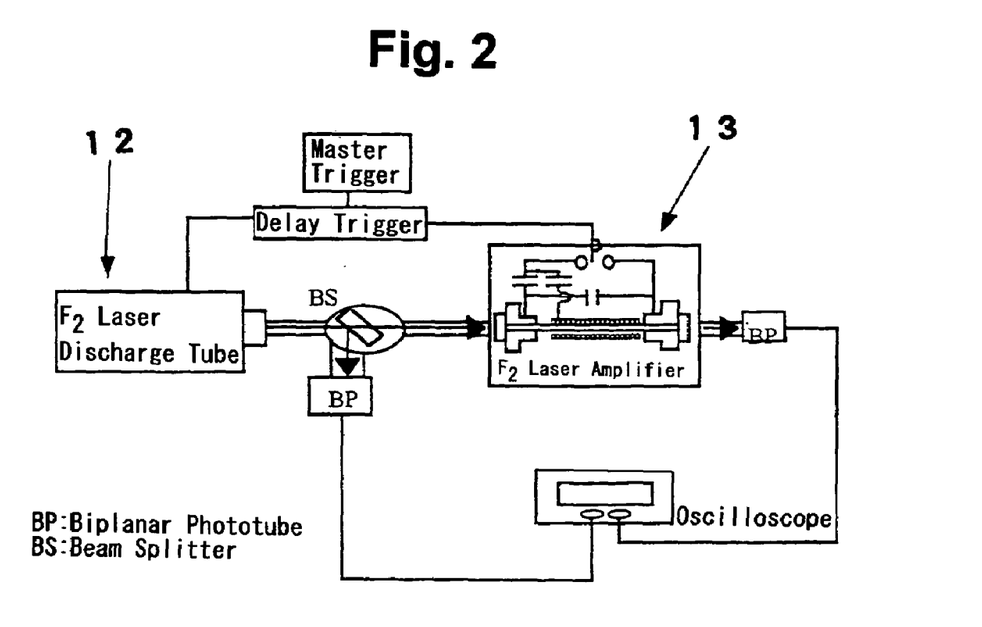
FIG. 2 is a diagram exemplifying a configuration of a gain measurement system in a low-pressure axial direction excitation type $F_2$ laser apparatus according to the present invention.

A configuration of its gain adjustment apparatus is shown in FIG. 2. A transverse direction excitation type $F_2$ laser discharge tube 12 having a length of 30 cm was used as an oscillator. First, $N_2$ gas was put in the discharge tube 12 and oscillation was caused. Oscillation light was passed through a coaxial discharge tube (amplifier) 13, and its output was measured. Each laser apparatus has a gap switch, and it is typically difficult to achieve synchronization. Therefore, a technique of measuring mutual oscillation times by using jitter of both switches, and thereby obtaining timing of incident light, was adopted.

In this type, pressure of one of the switches is changed and coarse time is determined. Since a time difference that fluctuates due to mutual jitter can be used as spread, accurate dependence of gain upon time with simple operation can be obtained.

After this gain measurement method was established in the $N_2$ laser, gain in the $F_2$ laser was measured. By the way, in order to prevent laser light from being absorbed by oxygen in the atmosphere, a path through which laser light passes was replaced by nitrogen gas and measurement was conducted. Here, a discharge length in the discharge tube of the $F_2$ laser is 15 cm, and used voltage is 20 kV.

Figure 3:
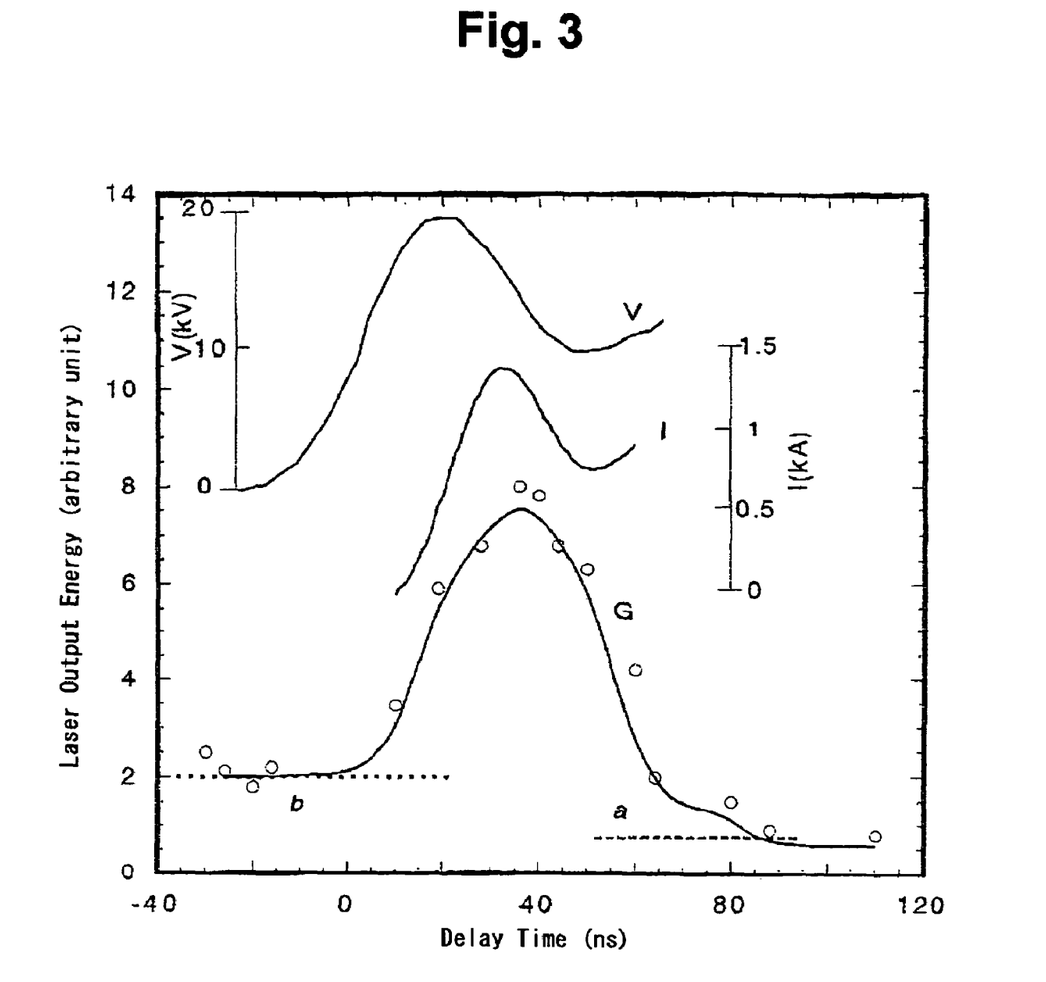
FIG. 3 is a graph showing a gain time waveform and a voltage and current waveform of a low-pressure axial direction excitation type $F_2$ laser apparatus according to the present invention.
Figure 4:
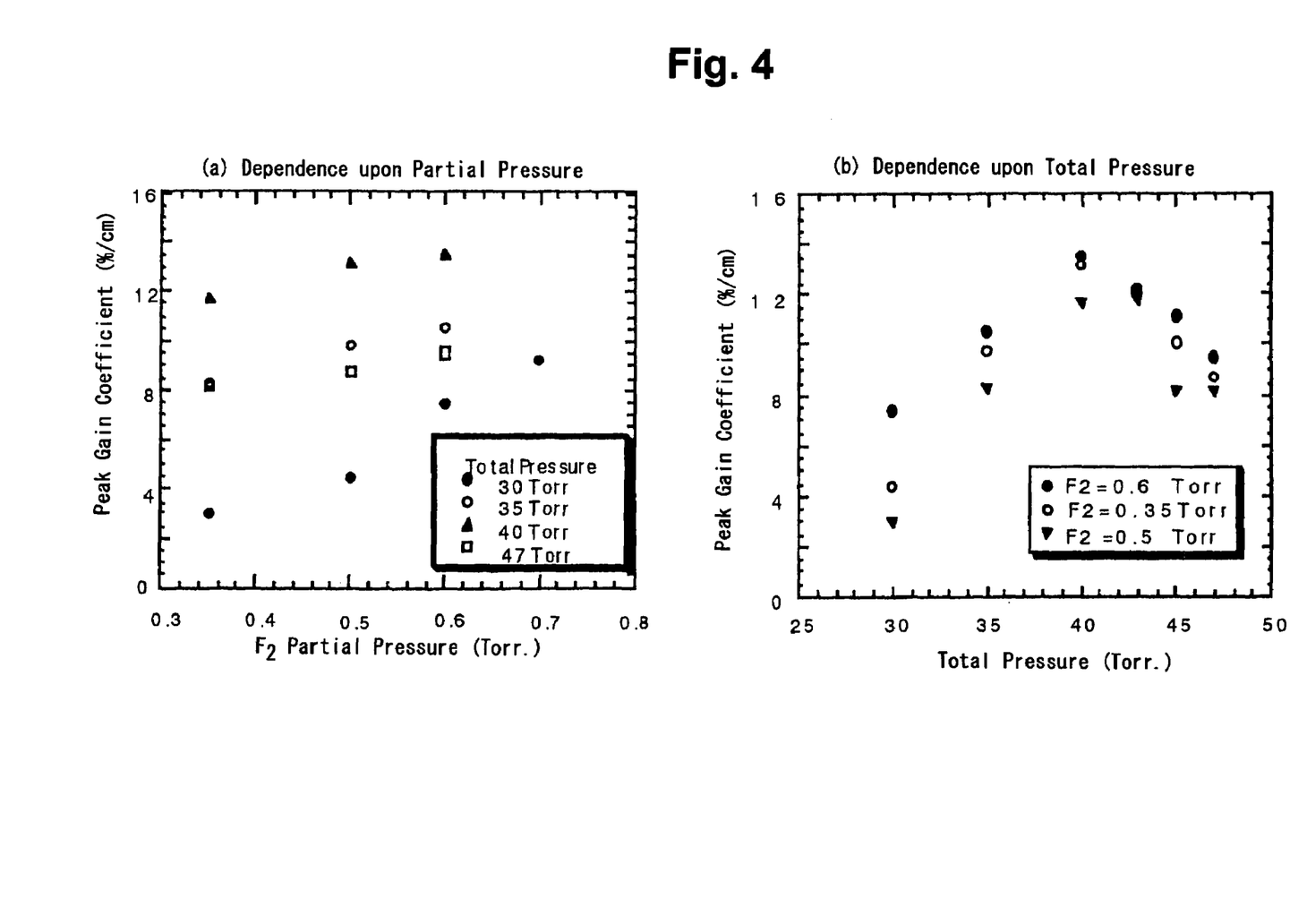
FIGS. 4(a) and 4(b) are graphs showing dependence of a gain coefficient upon $F_2$ partial pressure and total pressure in a low-pressure axial direction excitation type $F_2$ laser apparatus according to the present invention.

A temporal waveform of the gain in the $F_2$ laser measured by using the method described above, an actually measured voltage waveform, and a current waveform obtained by a circuit calculation are shown in FIG. 3. In FIG. 3, V represents a voltage waveform, I represents a current waveform, G represents a temporal waveform of the gain, "a" represents an output of only an amplifier, and "b" represents a total output of an oscillator and the amplifier. FIGS. 4(a) and 4(b) show dependence of a peak gain coefficient upon $F_2$ partial pressure and total pressure.

As a result of this measurement, it was found that gain rise lagged little behind a start of main discharge unlike in a case of high pressure. Furthermore, in a time zone lagging behind discharge start in the amplifier by approximately 60 nanoseconds, an output transmitted through the amplifier assumes a value close to a fluorescent amplified (ASE light) output of the amplifier alone, and laser light from the oscillator is not transmitted through the amplifier. This phenomenon is seen in a case of an $N_2$ laser as well. It can be said that distribution of a lower level of the laser becomes large, and absorption of laser light occurs.

Heretofore, a large number of gain measurements in the $F_2$ laser have been performed. However, a result of measurement of such strong absorption has not been seen. For this reason, it is considered that much attention has not been paid to a latter half of a pulse during conventional measurement, or collision de-ionization of a lower level occurs at a high pressure that amounts to several atm. Even with a gain measurement at 1 atm, however, similar strong absorption is seen. Therefore, a possibility of the former case is high.

In a case where the discharge length of the discharge tube was 15 cm and the voltage in use was 20 kV as a result of measurement, a maximum gain coefficient was 13.5%/cm, and a concentration of $F_2$ gas (partial pressure of $F_2$) and a total pressure with respect to total gas were 1.5% (0.6 Torr.) and 40 Torr., respectively, as shown in FIGS. 4(a) and 4(b). This gain coefficient has a value higher than a gain coefficient of 11%/cm obtained when mixed gas (0.25%) having a high pressure (1 atm) and having a smaller concentration of $F_2$ gas is put in the discharge tube. In view of this behavior in a wide range, gain decreases as pressure is decreased from a state of high atmospheric pressure, as shown in FIGS. 4(a) and 4(b). However, the gain rises again in the vicinity of 40 Torr. At this time, partial pressure of $F_2$ is 0.6 Torr. Therefore, an optimum concentration of $F_2$ is approximately 1.5%. A temporal rise of the gain also lags by approximately 15 nanoseconds in the case of a high pressure. On the other hand, at a low pressure, a delay time is not seen and a duration time of the gain also becomes long.

Embodiment 2

In the gain measurement in the low-pressure axial direction excitation type $F_2$ laser apparatus according to the present invention, a high gain was obtained in a low-pressure gas, as described above. Therefore, a shift to an oscillation experiment was conducted. As for a discharge length in the discharge tube and voltage in use, the discharge length is 15 cm and the voltage in use is 20 kV in the same way as with Embodiment 1. Initially, oscillation was attempted with an incidence side window of an amplifier used in an amplification experiment being replaced by a total reflection mirror. Since an aluminum evaporation mirror was used, however, air leaked from protection coating of $MgF_2$ provided at a surface although a quantity of the leak was slight, and oscillation was not conducted successfully. With the mirror placed outside a transmitting window and that portion also subjected to nitrogen purge, the oscillation experiment was conducted.

Since one extra window is provided and a window material of $CaF_2$ is used as an exit window, it is expected that the resonator remarkably gets out of an optimum condition.

Figure 5:
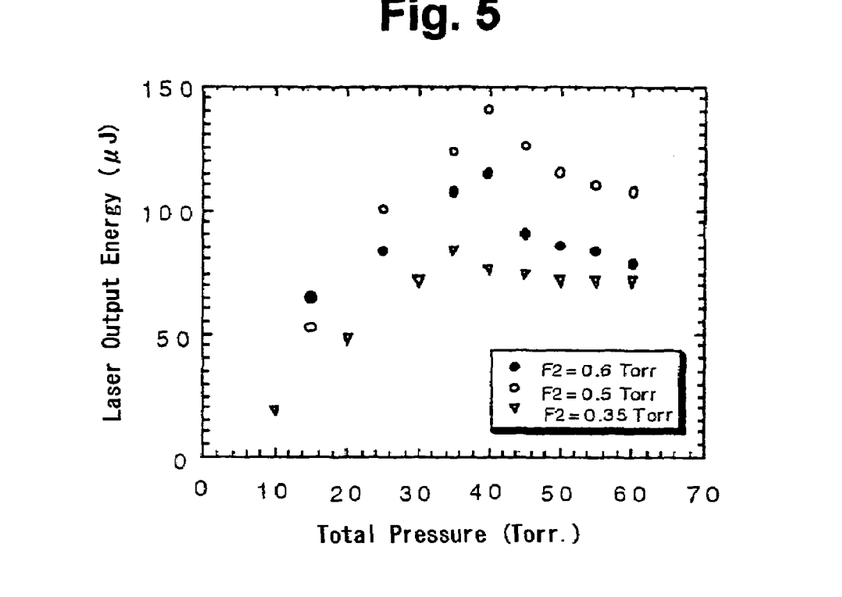
FIG. 5 is a graph showing dependence of a laser output upon gas pressure in a low-pressure axial direction excitation type $F_2$ laser apparatus according to the present invention.

In fact, an oscillation experiment was conducted, and output energy was measured with a gas mixture ratio and a total pressure of gas changed. Its result is shown in FIG. 5. In a case where the discharge length is 15 cm and the voltage in use is 20 kV, approximately 140 μJ is obtained as a highest value of the output with an $F_2$ concentration of 1.25%, an $F_2$ partial pressure of 0.5 Torr., and a total pressure of 40 Torr. This value exceeds 100 μJ for a high-pressure axial direction excitation type $F_2$ laser.

Figure 6:
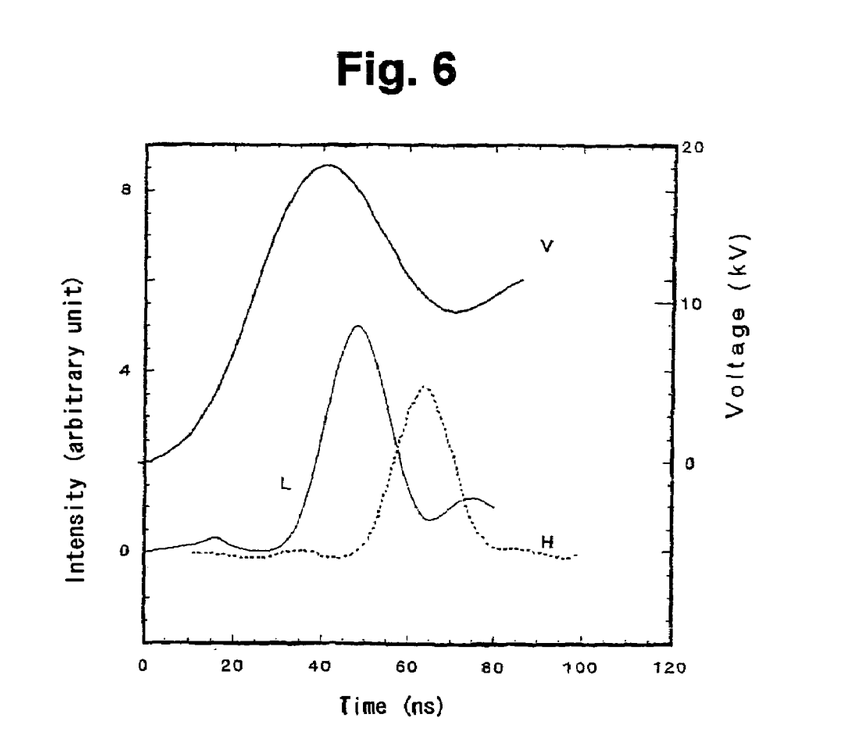
FIG. 6 is a graph showing a delay time of laser oscillation in a low-pressure axial direction excitation type $F_2$ laser apparatus according to the present invention.

Temporal relations between an oscillation waveform and a voltage waveform are shown in FIG. 6. In FIG. 6, V represents a voltage waveform, L represents an oscillation waveform at low pressure, and H represents an oscillation waveform at high pressure. The voltage waveform is one in a case of low pressure. An oscillation waveform at high pressure is shown so as to be aligned with discharge start time.

As shown in FIG. 6, a time of oscillation remarkably differs according to whether pressure is high or low. With low pressure, there is little delay time from discharge start. On the other hand, with high pressure, a delay of 15 nanoseconds is caused.

On a basis of the result described above, it is presumed that this oscillation at low pressure is generated by excitation of $F_2$ directly to an upper level due to electron collision in a discharge. It is considered that this oscillation at low pressure is remarkably different in terms of a mechanism for exciting $F_2$ from the conventional case where high gas pressure is used. On the basis of the fact that it has been confirmed that strong absorption is generated in a latter half of a pulse, and the fact that a pulse width becomes short to 4 nanoseconds in the case of stronger excitation, it is necessary in the $F_2$ laser to design the laser apparatus while considering distribution of the lower level, unlike in the case of other excimer lasers.

Furthermore, in the axial direction excitation type $F_2$ laser apparatus of this embodiment, it is easy to perform hard seal because structure is simple, and discharge is hard to degrade even if a remaining electric charge exists. Conversely, the remaining electric charge can serve also as preliminary ionization, and consequently the axial direction excitation type $F_2$ laser apparatus of this embodiment is suitable for high repetition operations. Furthermore, it has already been confirmed in the $N_2$ laser that a seal operation is possible, continuous oscillation of 100 Hz is possible without letting gas flow, and operation corresponding to 1 kHz is possible if a duration is extremely short. Therefore, it is considered that these can be applied to the $F_2$ laser as well.

Furthermore, in the axial direction excitation type laser, ultraviolet light is not used for preliminary ionization. Therefore, there is a possibility that gas life, which has posed a problem in a conventional transverse direction excitation type laser, matters little. According to a development conducted from now on, it is considered that rapid performance improvement and a laser apparatus that can withstand practical use in the severe industrial world are implemented.

In the experiment described above, it has been found that the $F_2$ laser that generates oscillation in a vacuum ultraviolet ray region has the same characteristics as those of a very simple $N_2$ laser. Therefore, it is considered that a seal technique, high repetition operations, and a switch less operation without high voltage switches, which have been implemented with the $N_2$ laser, can be applied easily. Since the $F_2$ gas itself has reactivity, however, it might be difficult to maintain a life of the discharge tube with complete sealing unlike the $N_2$ laser. However, a possibility that an apparatus that can continue oscillation with only simple supply of $F_2$ is high.

INDUSTRIAL APPLICABILITY

As heretofore described in detail, the present invention provides a small-sized, highly efficient, and low-cost low-pressure axial direction excitation type $F_2$ laser apparatus that generates oscillation at a pressure that is as low as 1/20 to 1/100 of pressure of a conventional apparatus.

The invention claimed is:
1. A low-pressure axial direction excitation type $F_2$ laser apparatus comprising:
   a discharge tube including an insulating cylinder and a metal electrode at each end of said insulating cylinder; and
   a reflecting mirror and a transmitting mirror, constituting a resonator, positioned outwardly of a corresponding said metal electrode, respectively, wherein said metal electrode at each end of said insulating cylinder is constructed and arranged to have a high voltage pulse applied thereto from a drive circuit such that an optical axis of laser light generated by oscillation, and a main discharge current, pass through the same path, and wherein a total gas pressure in said discharge tube is within a range of from 10 Torr to 100 Torr, and a concentration of $F_2$ gas to total gas within said discharge tube is within a range of from 0.2% to 2.0%.

2. The low-pressure axial direction excitation type $F_2$ laser apparatus according to claim 1, wherein said total gas pressure in said discharge tube is within a range of from 35 Torr to 45 Torr.

3. The low-pressure axial direction excitation type $F_2$ laser apparatus according to claim 2, wherein said low-pressure axial direction excitation type $F_2$ laser apparatus is constructed and arranged so as to have excitation density controlled and gain sustaining time controlled by changing a discharge voltage or capacitance such that laser light absorption, due to a long life of a lower level concerning laser oscillation, is avoided.

4. The low-pressure axial direction excitation type $F_2$ laser apparatus according to claim 3, wherein said low-pressure axial direction excitation type $F_2$ laser apparatus is constructed and arranged such that a gain length can be shortened, whereby a length of said resonator can be made to be 10 cm to 30 cm, so as to shorten a round-trip time of light and make said resonator sufficiently effective.

5. The low-pressure axial direction excitation type $F_2$ laser apparatus according to claim 2, wherein said low-pressure axial direction excitation type $F_2$ laser apparatus is constructed and arranged such that a gain length can be shortened, whereby a length of said resonator can be made to be 10 cm to 30 cm, so as to shorten a round-trip time of light and make said resonator sufficiently effective.

6. The low-pressure axial direction excitation type $F_2$ laser apparatus according to claim 1, wherein said low-pressure axial direction excitation type $F_2$ laser apparatus is constructed and arranged so as to have excitation density controlled and gain sustaining time controlled by changing a discharge voltage or capacitance such that laser light absorption, due to a long life of a lower level concerning laser oscillation, is avoided.

7. The low-pressure axial direction excitation type $F_2$ laser apparatus according to claim 6, wherein said low-pressure axial direction excitation type $F_2$ laser apparatus is constructed and arranged such that a gain length can be shortened, whereby a length of said resonator can be made to be 10 cm to 30 cm, so as to shorten a round-trip time of light and make said resonator sufficiently effective.

8. The low-pressure axial direction excitation type $F_2$ laser apparatus according to claim 1, wherein said low-pressure axial direction excitation type $F_2$ laser apparatus is constructed and arranged such that a gain length can be shortened, whereby a length of said resonator can be made to be 10 cm to 30 cm, so as to shorten a round-trip time of light and make said resonator sufficiently effective.

* * * * *